United States Patent
Wada et al.

(10) Patent No.: US 7,457,875 B2
(45) Date of Patent: Nov. 25, 2008

(54) ACCESS SERVER WITH FUNCTION OF COLLECTING COMMUNICATION STATISTICS INFORMATION

(75) Inventors: Mitsuhiro Wada, Fujisawa (JP);
Hiroaki Nakazawa, Chigasaki (JP);
Noriyuki Sueyoshi, Yokohama (JP);
Yasuo Murakami, Fujisawa (JP);
Hiroaki Miyata, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 676 days.

(21) Appl. No.: 10/898,429

(22) Filed: Jul. 26, 2004

(65) Prior Publication Data

US 2005/0198277 A1    Sep. 8, 2005

(30) Foreign Application Priority Data

Feb. 17, 2004    (JP) .............................. 2004-039378

(51) Int. Cl.
*G06F 15/173* (2006.01)
(52) U.S. Cl. ........................ 709/225; 709/203; 709/217; 709/218; 709/219; 709/224
(58) Field of Classification Search ................ 709/203, 709/224, 217–219, 225, 229; 713/201
See application file for complete search history.

(56) References Cited

U.S. PATENT DOCUMENTS

| | | | | |
|---|---|---|---|---|
| 6,628,671 | B1 * | 9/2003 | Dynarski et al. | 370/469 |
| 6,675,208 | B1 * | 1/2004 | Rai et al. | 709/224 |
| 6,694,437 | B1 * | 2/2004 | Pao et al. | 726/15 |
| 6,785,823 | B1 * | 8/2004 | Abrol et al. | 726/7 |
| 6,816,890 | B2 * | 11/2004 | Noda et al. | 709/213 |
| 7,020,708 | B2 * | 3/2006 | Nelson et al. | 709/230 |
| 7,152,160 | B2 * | 12/2006 | Lantto et al. | 713/168 |
| 7,190,687 | B1 * | 3/2007 | Hsu et al. | 370/338 |
| 7,197,017 | B1 * | 3/2007 | Rezaiifar et al. | 370/331 |
| 7,284,062 | B2 * | 10/2007 | Krantz et al. | 709/229 |
| 2003/0172143 | A1 * | 9/2003 | Wakayama | 709/223 |

FOREIGN PATENT DOCUMENTS

| | | |
|---|---|---|
| JP | 2000-163376 | 8/2000 |
| JP | 2000-252979 | 9/2000 |

* cited by examiner

*Primary Examiner*—Liangche A Wang
(74) *Attorney, Agent, or Firm*—Antonelli, Terry, Stout & Kraus, LLP.

(57) ABSTRACT

An access server starts the individual collection of communication statistics information on each of LCP sessions upon the establishment of a data link, individually collects communication statistics information on each of NCP sessions established on the LCP session, notifies a RADIUS server of the statistics information on the LCP session when the data link is released, and notifies, when the NCP session is released, the RADIUS server of the statistics information on the released NCP session.

11 Claims, 13 Drawing Sheets

MAIN SIGNAL TRANSFER PROTOCOL STACK

CONTROL SIGNAL TRANSFER PROTOCOL STACK

FIG. 8
PPP USER MANAGEMENT TABLE 55

| USER NAME (551) | Framed IP Address (552) | Framed IPv6 Prefix (553) | |
|---|---|---|---|
| kato | 10.0.0.1 | 3ffe:5000::/64 | 550-1 |
| tada | 10.1.1.5 | none | 550-2 |
| sato | none | 3ffd:1234::/48 | 550-3 |

FIG. 9
SESSION MANAGEMENT TABLE 56

| SESSION ID (561) | USER NAME (562) | NCP (563) | SESSION START TIME (564) | NUMBER OF INPUT PACKETS (565a) | NUMBER OF OUTPUT PACKETS (565b) | |
|---|---|---|---|---|---|---|
| xx | kato | — | 2003/4/3 22:00:01 | 166 | 961 | 560-1 |
| yy | kato | IPCP | 2003/4/3 22:00:10 | 67 | 333 | 560-2 |
| zz | kato | IPv6CP | 2003/4/3 22:00:16 | 99 | 628 | 560-3 |

FIG. 10
Acct-Session-Id 607

| LCP SESSION ID (621) | NCP IDENTIFIER (622) | NCP SESSION ID (623) | OTHER IDENTIFIER (624) |
|---|---|---|---|

ACCOUNTING-STOP REQUEST PACKET
FOR IPv4 : Accounting Request [stop] 600A

FIG. 12

ACCOUNTING-STOP REQUEST PACKET
FOR IPv6 : Accounting Request [stop] 600B

| | |
|---|---|
| IP HEADER | 601 |
| UDP HEADER | 602 |
| Radius Code : Accounting-Request | 603 |
| User Name (1) | 604 |
| Framed IPv6 Prefix (97) | 605B |
| Acct Status Type (40) = "stop" | 606 |
| Acct Session Id (44) | 607 |
| Acct Session Time (46) | 608 |
| Acct Terminate Cause (49) | 609 |
| Acct Input Octets (42) | 610 |
| Acct Output Octets (43) | 611 |
| Acct Input Packets (47) | 612 |
| Acct Output Packets (48) | 613 |
| Acct Input Gigawords (52) | 614 |
| Acct Output Gigawords (53) | 615 |

ACCESS SERVER WITH FUNCTION OF COLLECTING COMMUNICATION STATISTICS INFORMATION

CLAIM OF PRIORITY

The present application claims priority from Japanese application serial No. 2004-039378, filed on Feb. 17, 2004, the content of which is hereby incorporated by reference into this application.

BACKGROUND OF THE INVENTION (1) Field of the Invention

The present invention relates to an access server with the function of collecting communication statistics information and, more particularly, to an access server connected to a user access network and to an Internet service provider network (ISP network) and having the function of notifying an accounting server connected to the ISP network to manage communication statistics information of communication statistics information collected for each user-terminal.

(2) Description of Related Art

In an IP (Internet Protocol) network represented by the Internet, a communication agency (network management agency) which provides the service of connecting a user terminal to the IP network is termed an Internet Service Provider (ISP). The ISP verifies that an access requesting user is an authorized subscribing user prior to the use of an access server by a user terminal and establishes a session between the access server and the user terminal.

As a communication protocol for establishing a session between the access server and the user terminal, PPP (Point-to-Point Protocol) has been used widely. The PPP is originally a protocol for providing a TCP/IP or like link on a serial line such as a telephone line or a dedicated line and has been standardized as RFC (Request for Comments) 1661 at IETF (Internet Engineering Task Force).

The PPP is composed of an LCP (Link Control Protocol) operating in the data link layer of an OSI reference model and an NCP (Network Control Protocol) operating in a network layer. The LCP is a protocol for controlling a link which establishes a data link between two communication devices through a negotiating operation concerning communication conditions such as a data size, the presence or absence of data compression, and a transmission speed and performs a control operation for examining and releasing the data link. On the other hand, the NCP performs, after the establishment of a link (LCP session) in accordance with the LCP, the selection of a higher-layer protocol for the network layer, the allocation and setting of a network address and the like. For the NCP protocol, a plurality of control protocols are prepared depending on the type of a network protocol so that the NCP protocol is adaptable to various protocols such as IP and AppleTalk.

An ISP stores personal information on users and statistics data as attribute values in a database, which is managed in a unified manner by, e.g., a management server such as an authentication server or an accounting server. The management server is normally communicative with an access server on the Internet via an IP network. For session management between these servers and between the access server and a user terminal, the RADIUS (Remote Authentication Dial In User Service) is used normally. Communication protocols concerning the RADIUS are defined as, e.g., the RFC 2138, the RFC 2139, the RFC 2865, the RFC 2866, and the RFC 2869.

The RADIUS has adopted a server client system which operates the server for managing the attribute information such as the user information and the statistics information described above as a RADIUS server and operates an access server for accepting access from a user as a RADIUS client, thereby enabling the transmission and reception of attribute information between the access server and the RADIUS server.

The first role of the RADIUS server is the management of user authentication information. For example, the access server having received an Internet access request from a user terminal extracts user authentication information including a user name and a password from the access request and transmits the extracted information to the RADIUS server in accordance with the RADIUS authentication protocol. Upon receiving the user authentication information from the access server, the RADIUS server judges whether the requester is an authorized subscribing user or not by comparing the received user authentication information with user authentication information preliminarily registered in the database and notifies the access server of the result of judgment. If the access requesting user has proved to be an authorized user as the result of authentication, the access server executes a connection control operation for a PPP session between the user terminal and the access server.

The second role of the RADIUS server is the management of statistics information for each user. When the user authentication and the PPP connection are completed successfully, the access server transmits a control packet indicating that the user has started the Internet use to the RADIUS server and starts to collect statistics information on the user. When the user has terminated a data link, the access server transmits a control packet indicative of the release of the link (termination of the Internet use) to the RADIUS server. The control packet includes an identifier (ID) for identifying the user and notifies the RADIUS server of the statistics information including, e.g., a PPP link session time and an amount of communicated data. Using the RADIUS functions described above, a majority of ISPs perform user authentication and collect management information for accounting and a network extension plan.

With the recent increase in the number of Internet users, a dual stack network which allows the use of the IPv6 having a new address system in addition to the existing IPv4 has been constructed. To use the IPv6 on the PPP, it becomes necessary to equip the NCP with a control protocol for the IPv6 and define attributes for the IPv6 for the RADIUS. As the control protocol for the IPv6, the RFC 2472 has already defined the IPv6CP, while the RFC 3162 has defined the IPv6 support attributes for the RADIUS as the attributes for the IPv6.

An IP version to be used on the PPP is specified by the attributes of a response packet (authentication success packet) returned from the RADIUS server to the access server in response to an authentication request. That is, by transmitting only IPv4-related attributes, only IPv6-related attributes, or attributes related to each of the IPv4 and the IPv6, the RADIUS server can notify the access server that a usable IP protocol is the IPv4, the IPv6, or the IPv4/IPv6, respectively.

On the other hand, the NCP can be operated independently at each user terminal. Each user is allowed to establish an arbitrary NCP at any time and release the NCP at any time during a period after the establishment of a link in accordance with the LCP till the release of the link. User management is performed by using IDs unique to each of links (LCP sessions) set in the access server. Accordingly, when a plurality of NCP sessions are established on a PPP as described above, it has conventionally been impossible to collect statistics information such as a session time and an amount of data on a per NCP basis, though it was possible to individually collect the statistics information on each of links (LCP sessions) established in accordance with the LCP.

As a prior art technology related to the collection of communication statistics information, Japanese Laid-Open Patent Publication No. 2000-16337 (Patent Document 1) proposes a traffic monitoring system which determines the type of a protocol used for an IP packet, e.g., the use of electronic mail or the Web by analyzing the header of the IP packet, individually measures a communication time from the first packet to the final packet for each of the protocols in use, and records the measured communication time as a per-protocol based session time for each of the users.

On the other hand, Japanese Laid-Open Patent Publication No. 2000-252979 (Patent Document 2) proposes a connection system between a CATV network accommodating therein a larger number of user terminals and the Internet, wherein a data amount probe unit determines the address of a transmitter, an amount of data, the type of a protocol (including the type of data) from the contents of the header of an IP packet to be transferred and notifies a data amount summing unit of the determined information via an internal bus so that the data amount summing unit individually sums up statistics data for each of IP addresses and for each of protocols.

SUMMARY OF THE INVENTION

In order to collect the communication statistics information on a per NCP basis for each of the users at the foregoing RADIUS server, a new attribute may be added appropriately as, e.g., a RADIUS attribute. However, the problem is encountered that the addition of a new attribute causes the necessity to change software at each of the RADIUS server and a RADIUS client (access server) and increases an amount of changing work.

An object of the present invention is to provide an access server capable of collecting statistics information on a per NCP basis without involving the addition of an attribute to the RADIUS.

To attain the above object, according to the present invention, an access server for managing sessions for each user is provided with the function of measuring communication statistics information including a session time and an amount of input/output data for each of an LCP session and an NCP session established on a data link (PPP session) and with the function of notifying, at a predetermined timing, an accounting server, which is connected to an Internet service provider (ISP) network for managing communication information for each user, of the statistics information on each of LCP sessions and the statistics information on each of NCP sessions.

More specifically, according to the present invention, an access server connected to a user access network and to an Internet service provider (ISP) network is comprised of: first means for individually collecting communication statistics information on each of sessions formed in accordance with an LCP (Link Control Protocol) in response to a data link establish request from a user terminal connected to the user access network and notifying, when the data link is released, an accounting server connected to the ISP network for managing the communication statistics information of the statistics information on the LCP session corresponding to the released data link; and second means for individually collecting communication statistics information on each of NCP (Network Control Protocol) sessions established on the foregoing LCP session and notifying, when the NCP session is released, the accounting server of the statistics information on the released NCP session.

One characteristic feature of the present invention resides in that the first means transmits, when the LCP session is established, a statistics process start request for the LCP session to the accounting server and transmits, when the data link is released, a statistics process stop request including the statistics information on the LCP session to the accounting server, and the second means transmits a statistics process start request for the NCP session to the accounting server when the NCP session is established and transmits, when the NCP session is released, a statistics process stop request including the statistics information on the released NCP session to the accounting server. However, the notification of the accounting server of the statistics information performed by the access server is not limited to the time at which the data link or the NCP session is released, as described above. The notification may also be performed periodically while a user terminal is in a communicating state.

Another characteristic feature of the present invention resides in that the first means notifies the accounting server of the statistics information on the LCP session by using a packet imparted with an identifier specific to each of the LCP sessions, and the second means notifies the accounting server of the statistics information on the NCP session by using a packet imparted with an identifier specific to each of the NCP sessions. The NCP session identifier has a value not only different depending on the type of an IP control protocol in use such as, e.g., the IPCP or IPv6CP, but also different on a per session basis even in the case where a session is released and then established again in accordance with the same IP protocol, such that an identifier different from that of the previous session is imparted to the re-established session.

In a preferred embodiment of the present invention, the second means notifies the accounting server of the statistics information on the released NCP session by using a packet including a session identifier composed of a combination of an identifier specific to each of the NCP sessions and an identifier of the LCP session to which the NCP session belongs such that the accounting server is allowed to correlate the LCP session statistics information with the NCP session statistics information.

In the case where the accounting server is connected to an ISP network as a RADIUS server having the user authentication function, each of the first and second means notifies the accounting server of the statistics information collected thereby in a packet format in accordance with a RADIUS (Remote Authentication Dial In User Service) protocol.

In accordance with the present invention, even when the same user operates a plurality of NCP protocols on the same link (PPP session), the access server individually collects statistics information on each of NCP sessions, and notifies an accounting server (RADIUS server) of the statistics information with an ID specific to each of the sessions, so that the accounting server is allowed to individually manage the statistics information including a session time and an amount of input/output data on each of the users and each of the sessions. Since there are occasions where an IPv4 session and an IPv6 session are sustained on different backbones on the Internet, information effective in the operation and design of a network is obtainable by managing the statistics information on a per NCP-session basis according to the present invention.

BRIEF DESCRIPTION OF THE DRAWINGS

FIG. 8 is a view showing an embodiment of the PPP user management table 55 provided in the control processing unit 44;

FIG. 9 is a view showing an embodiment of the session management table 56 provided in the control processing unit 44;

FIG. 10 is a view showing an example of an Acct-Session-ID used in an accounting packet transmitted from the access server 4 to the accounting server 20;

FIG. 12 is a view showing the format of an accounting stop request packet transmitted from the access server 4 to the accounting server 20 when an IPv6CP session is released;

DESCRIPTION OF THE PREFERRED EMBODIMENTS

Figure 1:
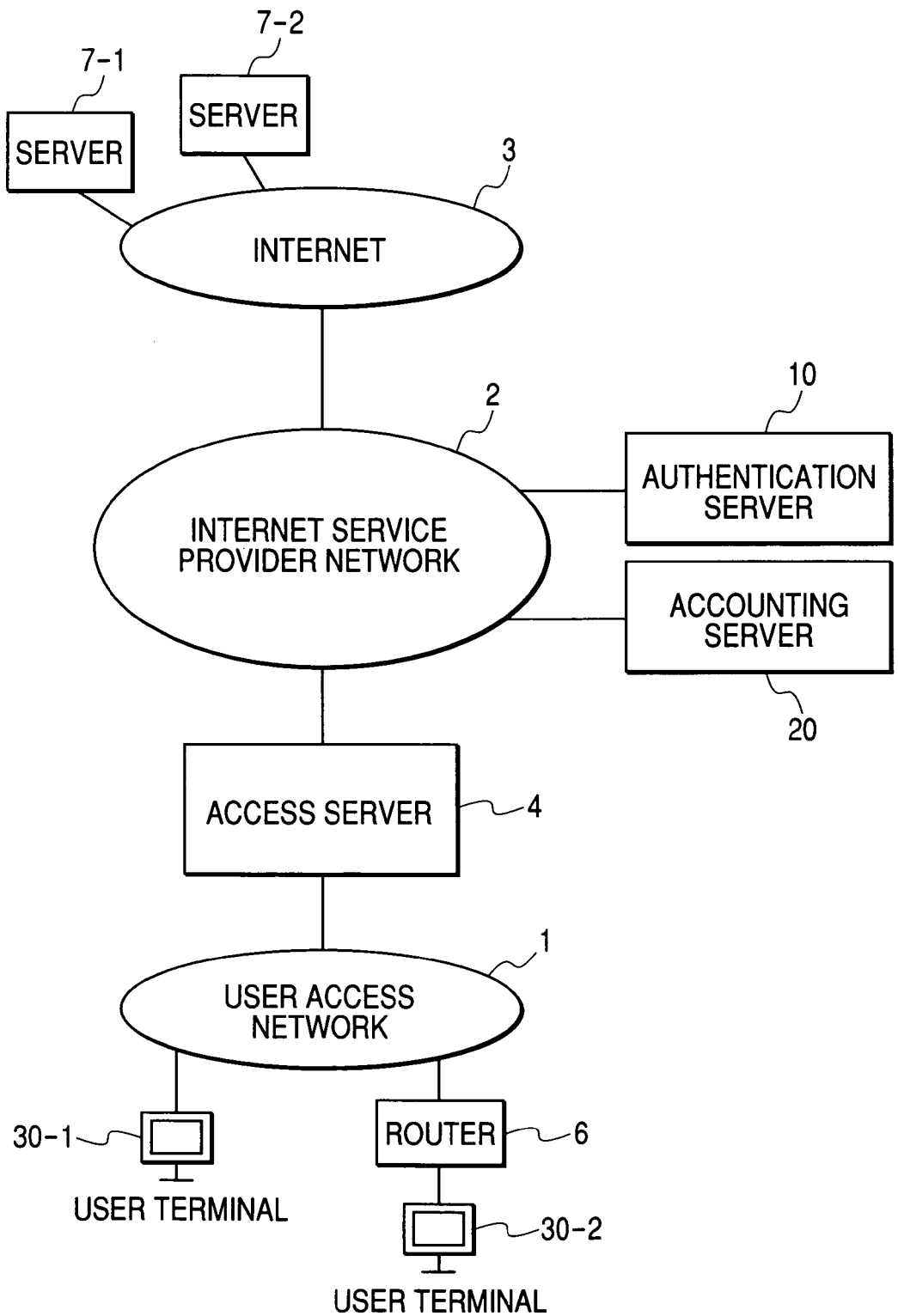
FIG. 1 is a view showing a first embodiment of a network configuration to which an access server according to the present invention is applied.

Referring to the drawings, the embodiments of the present invention will be described herein below.

FIG. 1 shows a first embodiment of a network configuration to which an access server according to the present invention is applied.

In FIG. 1, a numeral 1 denotes a user access network to which a plurality of user terminals 30 (30-1, 30-2, ...) are connected, 2 denotes an Internet service provider (ISP) network, and 3 denotes the Internet connected to the ISP network 2. The user access network 1 is composed of, e.g., a public switched telephone network or a broadband network such as ADSL or FTTH. An authentication server 10 and an accounting server 20 for managing statistics information are connected to the ISP network 2. Servers 7 (7-1, 7-2, ...) for various information services used by users are connected to the Internet 3.

User terminals 30 (30-1, 30-2, ...) are terminals belonging to an Internet service provider and connected to an ISP Internet service provider network 2 via the user access network 1 and the access server 4. Between the user terminals 30 and the access server 4, the PPP is applied as a protocol for the establishment of a link used by the user terminals, user authentication, and the allocation of IP addresses. The PPP is terminated at a user terminal if the user terminal is connected directly to the user access network 1 like the user terminal 30-1. For the user terminal 30-2 connected to the user access network 1 via, e.g., a router 6 for home use, the PPP is terminated at the router 6.

Figure 2:
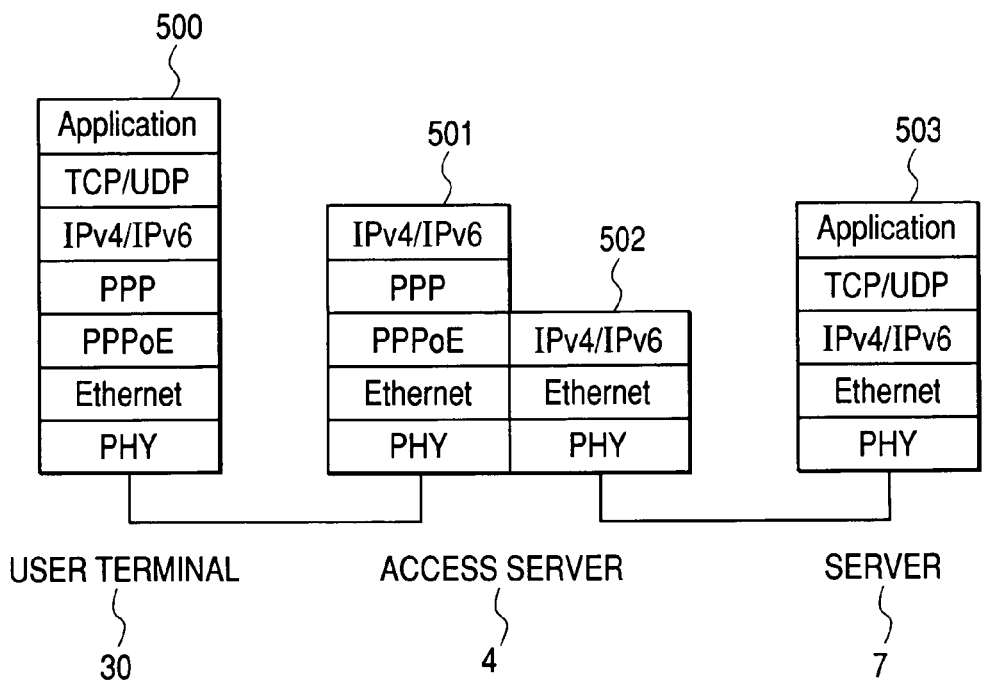
FIG. 2 is a view showing an example of a main signal transfer protocol stack applied to the network of FIG. 1.

FIG. 2 shows an example of a main signal transfer protocol stack necessary for the user terminal 30-1 and a target server 7 on the Internet 3 to communicate with each other via the access server 4 over the network shown in FIG. 1.

Since the user terminal 30-1 and the access server 4 are connected in accordance with the PPP, a PPP protocol exists in each of the protocol stack 500 of the user terminal 30-1 and the protocol stack 501 of the access server 4. A protocol stack lower in order than the PPP differs depending on the type of the link layer of the user access network 1. By way of example, the case where the link layer is the Ethernet (registered trademark) is shown in the drawing. Data is transferred from the access server 4 to the target server 7 in accordance with the IPv4/IPv6 (the IPv4 protocol or the IPv6 protocol), as shown in the protocol stacks 502 and 503.

Figure 3:
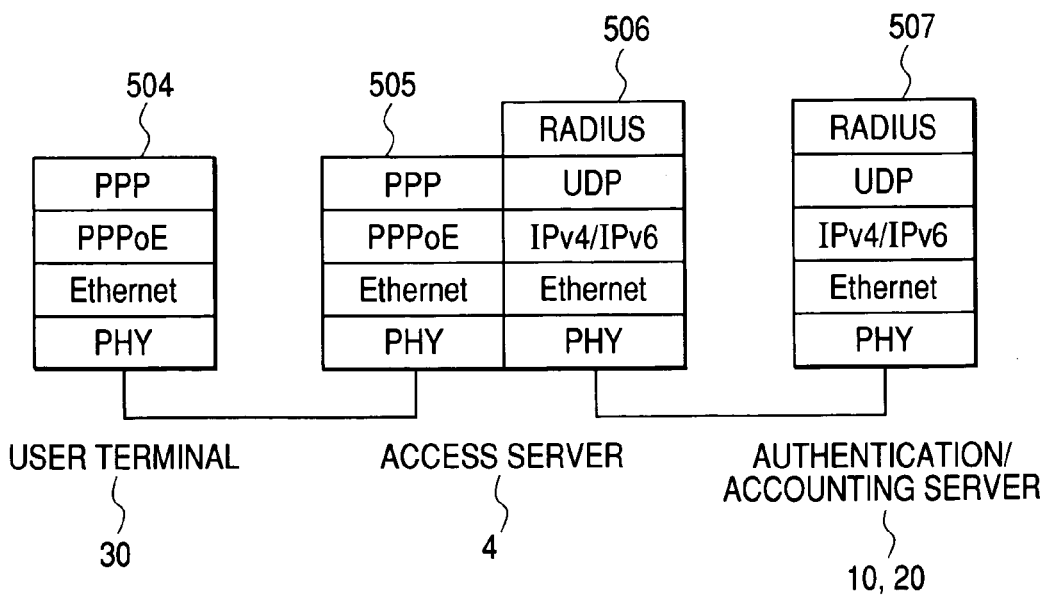
FIG. 3 is a view showing an example of a control signal transfer protocol stack applied to the network of FIG. 1.

FIG. 3 shows an example of a control signal transfer protocol stack necessary for the communication of control information such as user authentication information, statistics information (accounting information), and collecting conditions therefor.

As shown in the protocol stacks 504 and 505, the control information is communicated between the user terminal 30-1 and the access server 4 in accordance with the PPP protocol. On the other hand, the control information is communicated between the access server 4 and each of the authentication server 10 and accounting server 20 of the ISP network in accordance with the RADIUS protocol, as shown in protocol stacks 506 and 507. In the RADIUS protocol, RADIUS attribute values are defined, which will be described later. The authentication server 10 and the accounting server 20 communicate the control information necessary for an authentication processing and statistics information collection (accounting process) with the access server 4 by imparting a required attribute to the data portion (payload portion) of each of packets.

Figure 4:
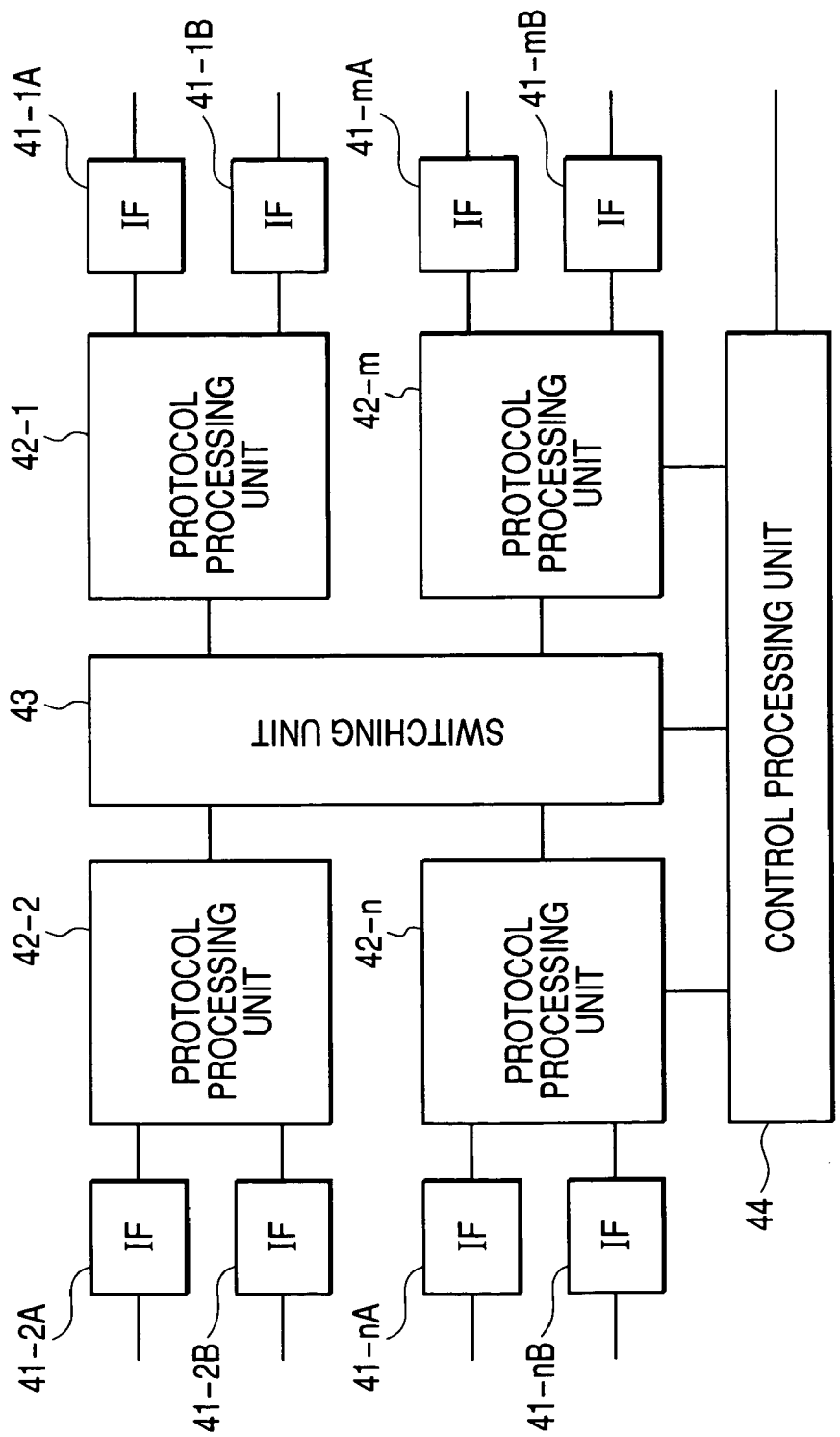
FIG. 4 is a block diagram showing an example of the hardware configuration of the access server 4.

FIG. 4 is a block diagram showing an example of the hardware configuration of the access server 4.

The access server 4 is composed of: a control processing unit 44 for controlling the entire server; a switching unit 43 for outputting a packet to a specified line; a plurality of protocol processing units 42 (42-1 to 42-n) for processing a data link layer and an IP protocol as a higher-order layer; and a plurality of line interfaces (IF) 41 (41-1A to 41-nB) each having the function of terminating a physical layer in accordance with the type of a connection line. Here, the line interfaces 41-1A, 41-2A, ... and 41-nA indicate interfaces for input lines, while the line interfaces 41-1B, 41-2B, ... and 41-nB indicate interfaces for output lines.

Figure 5:
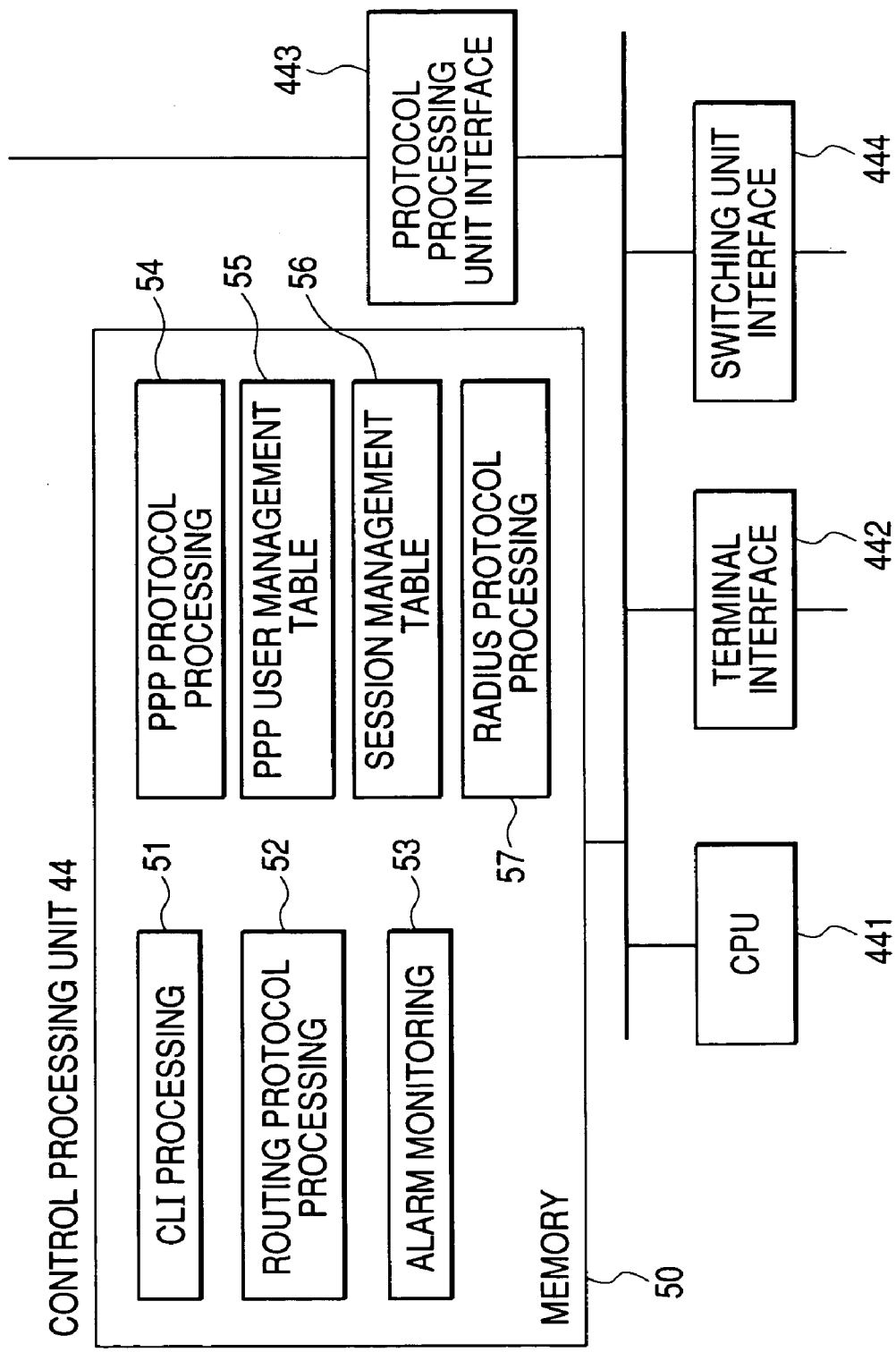
FIG. 5 is a block diagram showing an embodiment of the control processing unit 44 of the access server 4.

FIG. 5 is a block diagram showing an embodiment of the control processing unit 44 for controlling the access server 4.

The control processing unit 44 is composed of: a memory 50; a data processor (CPU) 441; a control terminal interface (CLI: Command Line Interface) 442 for communication with a control terminal disposed outside; a protocol processing unit interface 443 for communication with the protocol processing unit 42; and an switching unit interface 444 for communication with the switching unit 43. The CPU 441 executes various programs prepared in the memory 50, which will be described later.

The memory 50 stores therein, as programs related to the present invention, e.g., a CLI (Command Line Interface) processing routine 51, a routing protocol processing routine 52, an alarm monitoring processing routine 53, a PPP protocol processing routine 54, and a RADIUS protocol processing routine 57. Besides the above programs, a PPP user management table 55 and a session management table 56 are formed in the memory 50.

The CLI processing routine 51 is a program for processing control commands inputted by a system administrator to the CLI 442 from a control terminal (not shown) to control the access server 4. The routing protocol processing routine 52 is a program for processing routing information required by each of the routing protocol processing units 42 to transfer an input packet from any of the line interfaces 41 to one of the other line interfaces 41 corresponding to a destination address. The routing information designated by the system administrator is set to an IPv4 or IPv6 routing table (not shown) provided in each of the protocol processing units 42 in accordance with the routing protocol processing routine 52.

Each of the protocol processing units 42 performs a routing process with respect to a received packet by referring to the routing table. A packet received by each of the input line interfaces 41-iA (i=1 to n) from the network is imparted with, e.g., an additional internal header including the routing information corresponding to the destination address of a packet header in the protocol processing unit 42-i and then transferred to the switching unit 43. Information necessary for PPP protocol processing and RADIUS protocol processing is transferred to the control processing unit 44. The switching unit 43 transfers the input packet from each of the protocol processing units 42 to any of the protocol processing units in accordance with the routing information indicated by the internal header. Each of the protocol processing units 42-j (j=1 to n) removes the internal header from the packet received from the switching unit 43 and outputs the packet to the output line interface 41-jB.

The alarm monitoring processing routine 53 is a program for monitoring an alarm signal generated in the access server 4 and performs an operation responding to the alarm signal. The PPP protocol processing routine 54 for processing a PPP protocol signal executes a PPP termination process, an LCP (Link Control Protocol) process, an authentication process such as the PAP (Password Authentication Protocol) or CHAP (Challenge Handshake Authentication Protocol), and the processing of an IPv4 layer or an IPv6 layer such as an NCP process in accordance with the IPCP (Internet Protocol Control Protocol) or the IPv6CP in conjunction with the protocol processing units 42 and in accordance with an RFC related to the PPP such as the RFC 1332, the RFC 1661, the RFC 1994, the RFC 2472, or the RFC 2516.

The RADIUS protocol processing routine 57 handles general RADIUS protocols including the RFC 2138, the RFC 2139, the RFC 2865, the RFC 2866, and the RFC 3162 and transfers, when PPP authentication is required, information such as a user ID and a password to the authentication server 10 in conjunction with the PPP protocol processing routine 54.

If the user authentication is completed successfully, the authentication server 10 notifies the access server 4 of, e.g., network setting conditions such as an IP address to be used by the user as attribute information on the authenticated user. The access server 4 stores the attribute information on each of the users received from the authentication server 10 in the PPP user management table 55 until a PPP session is released.

When the user terminal 30 having succeeded in authentication establishes an LCP session with the access server 4, the access server 4 starts a statistics information (accounting information) collecting process. As the statistic information, information such as a session time and an amount of communicated packets have to be collected individually for each of LCP and NCP sessions. The present invention generates an entry having a new session identifier in the session management table 56 when a new LCP or an NCP session is established and manages the statistics information such as the session time and the amount of communicated packets by using the entry. A preferred method of generating the session identifier will be described later.

Upon recognizing the establishment of an LCP session for the PPP user, the access server 4 generates a start request packet for an accounting (statistics information collecting) process in accordance with the RADIUS protocol processing routine 57 and transmits the generated packet to the accounting server 20. When the PPP user releases the NCP or LCP session, the access server 4 generates an accounting process stop request packet for the released session in accordance with the RADIUS protocol processing routine 57 and transmits the generated packet to the accounting server 20.

The access server 4 accumulates the statistics information collected while the PPP session is sustained in the session management table 56 and notifies the accounting server 20 of the statistics information by using the accounting process stop request packet generated when the session is released. The access server 4 may also generate in accordance with the RADIUS protocol processing routine 57 an interim accounting packet indicative of the current value of the statistics information periodically or in response to an event such as the occurrence of or recovery from congestion or a fault on the network and transmit the generated packet to the accounting server 20. As the statistics information, information of an arbitrary type can be communicated by setting the RADIUS attributes defined in the RADIUS protocol to the data portion of a packet to be transmitted.

Referring to FIGS. 6 to 11, the operation of the access server 4 according to the present invention will be described.

Figure 6:
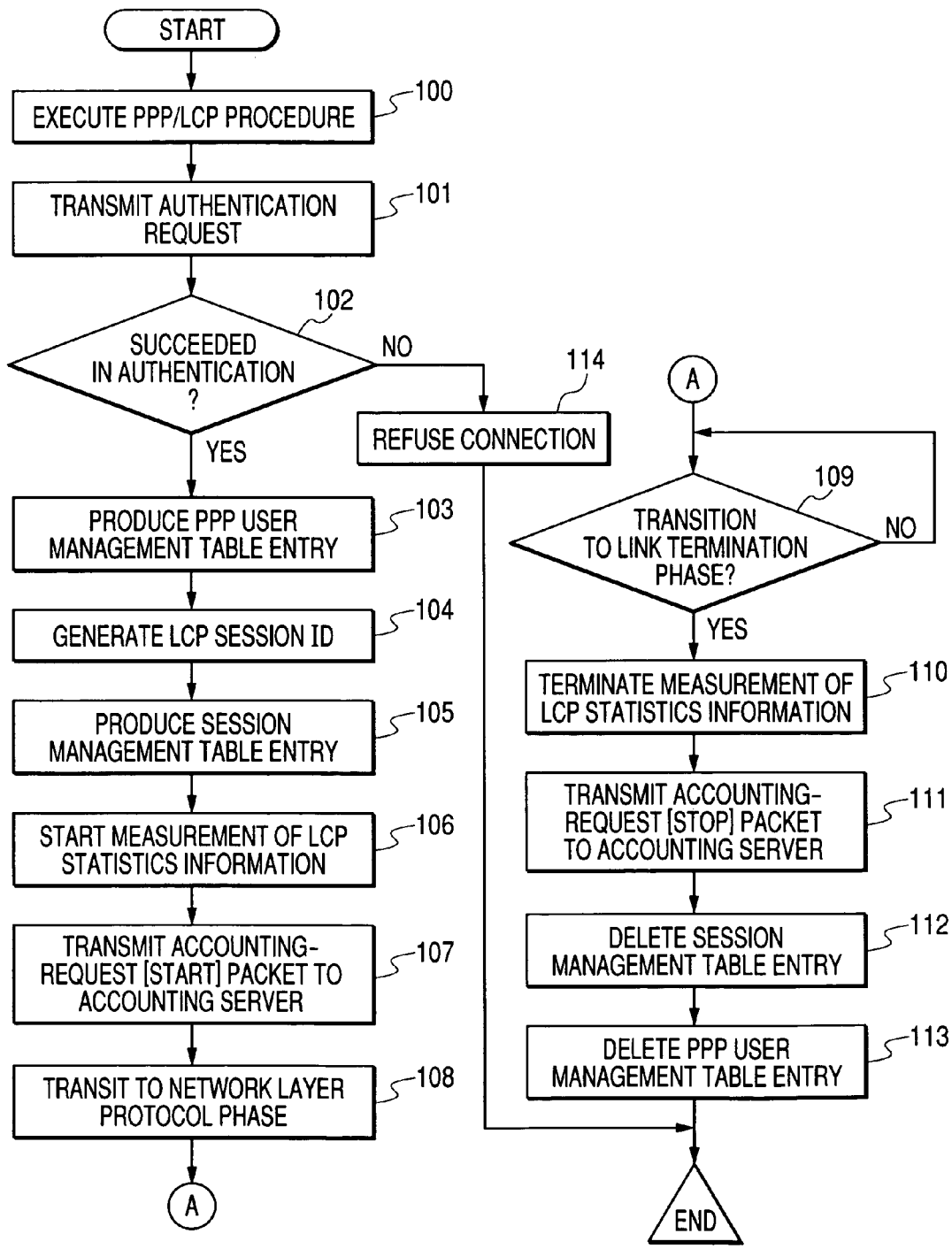
FIG. 6 is a flow chart illustrating the operation of the access server 4 between the receiving of a session establish request from a user terminal and the release of the session.

FIG. 6 shows the operation of the access server 4 after the reception of a data link establish request from the user terminal 30 (PPP user) till the release of a PPP session.

Upon receiving a PPP session request from the user terminal 30 or the router 6, the access server 4 executes the procedure for establishing a data link (PPP session) and an LCP negotiation with the user terminal (Step 100) and waits for an authentication request from the user terminal. Upon receiving an authentication request from the user terminal, the access server 4 generates an authentication request packet addressed to the authentication server 10 by the RADIUS protocol processing unit 57, transmits the generated packet to the authentication server 10, and waits for a response from the authentication server 10 (102). If the authentication has failed, the access server 4 refuses the establishment of a session and terminates the routine (114). If the authentication is completed successfully, the access server 4 produces a new entry corresponding to the PPP user in the PPP user management table 55 (103).

FIG. 8 shows an example of the PPP user management table 55. In the example shown here, each of entries 550 (550-1, 550-2, 550-3, . . . ) of the PPP user management table 55 is composed of a user name (user ID) field 551, a Framed IP Address field 552 indicative of an IPv4 address to be given to the user, and a Framed IPv6 Prefix field 553 indicative of an IPv6 prefix to be given to the user. Since a PPP connection has the possibility of being set under different network conditions depending on the user, data registration is not necessarily performed in all the foregoing fields of each of the entries of the PPP user management table 55. There are also cases where a field other than the fields 551 to 553 is added to the table entry.

After adding a new entry to the PPP user management table 55, the access server 4 generates an ID for an LCP session (104), and adds a new entry having the LCP session ID to the session management table 56 (105). The LCP session ID generated upon the establishment of the PPP session has a unique value different from the LCP session IDs of the other PPP sessions already established.

FIG. 9 shows an example of the session management table 56.

Each of the entries 560 (560-1, 560-2, 560-3, . . . of the session management table 56 is composed of a session ID field 561, a user name field 562, an NCP field 563 indicative of a network layer protocol used on an LCP session, a field 564 indicative of a session start time, and a statistics information count field. In the example shown here, the statistics information count field includes an input packet count field 565a and an output packet count field 565b. In the entry produced upon the establishment of an LCP session, the NCP field 563 is in blank as shown in, e.g., the entry 560-1.

The access server 4 adds an entry to the session management table 56 and starts the measurement of the statistics information on an LCP session (106). Since the NCP field 563 of the statistics information entry for the LCP is in an unspecified status, the statistics data measurement is performed for all of the NCPs on the PPP as a target. The measurement is carried out by the protocol processing circuit 42-i serving as the PPP termination point. The statistics data measured by the protocol processing circuit 42-i is periodically collected into the session management table 56.

The access server 4 establishes the LCP session and transmits to the accounting server 20 an accounting start request packet for requesting the start of a statistics processing for the LCP session (107). The accounting start request packet (Accounting-Request [start]) includes, as the RADIUS attributes, e.g., a User-Name attribute indicative of a user name for identifying the user terminal 30 as an Internet access request source, a Framed-IP-Address attribute indicative of an IP address allocated to the user terminal, an Acct-Status-Type attribute indicative of the type of a request packet (accounting start, accounting stop, or interim accounting), and an Acct-Session-ID attribute for identifying a data link (LCP session) between the user terminal and the access server.

To the Acct-Status-Type attribute of the accounting start request packet, a start code (1) indicative of an accounting process start request is set. An LCP session ID may be allocated appropriately to the Acct-Session-ID attribute. Values to be set to the User-Name attribute, the Framed-IP-Address attribute, and the like are obtainable from the PPP user management table 55.

When all the processing on a link level are completed, the access server 4 proceeds the PPP session to a network layer protocol phase such that the network layer protocol can be opened at any time (108). The operation of the network layer protocol phase will be described later with reference to FIG. 7. The access server 4 sustains the network layer protocol phase unless an event such as a line disconnect request or a forcible line disconnection occurs. When a line disconnect request or a forcible line disconnect event occurs, the access server 4 proceeds to a link termination phase, which will be described herein below (109).

After proceeding to the link termination phase, the access server 4 terminates the measurement of the statistics information for the LCP session and collects statistics information from the protocol processing circuit 42-i corresponding to the released LCP session (PPP) into the session management table 56 (110). Thereafter, the access server 4 generates an accounting stop request packet (Accounting-Request [stop] including statistics information and transmits the generated packet to the accounting server 20 (111). A specific format of the accounting stop packet will be described later.

After transmitting the accounting stop request packet, the access server 4 deletes the entry corresponding to the released LCP session from the session management table 56 (112) and deletes the entry of the user corresponding to the released LCP session from the PPP user management table 55 (113), thereby terminating this routine.

Figure 7:
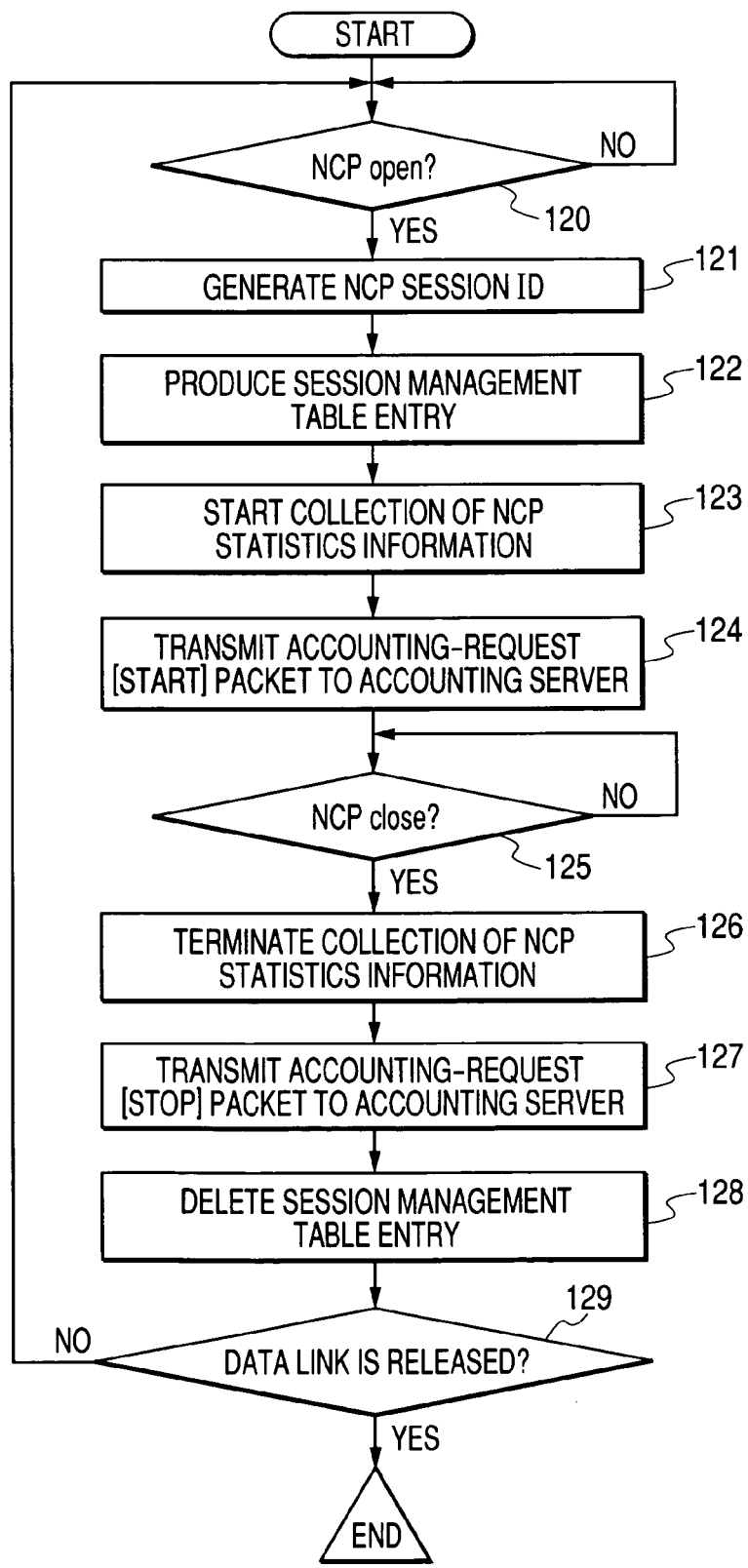
FIG. 7 is a flow chart illustrating the operation of the access server after proceeding to a network layer protocol phase (Step 108) in FIG. 6.

Referring to FIG. 7, a description will be given next to the operation of the access server 4 that has proceeded to the network layer protocol (NCP) phase (108).

In the network layer protocol phase, an arbitrary NCP session can be established at any time. The access server 4 monitors an NCP open request from the user terminal 30 (120) and generates a new NCP session ID when an open request is received (121). The NCP session ID has a value unique to every NCP session formed on the same PPP. The session ID has a value not only different from that of an NCP session ID of another type, but also different on a per session basis even in the case where a session is established, released temporarily, and then established again in accordance with the same NCP protocol, such that the released session and the re-established session can be recognized as different sessions.

The access server 4 generates a new entry having the session ID, adds the generated entry to the session management table 56 (122), and starts the collection of statistics information for the NCP session (123). The table entry generated here includes information for identifying the NCP in use such as "IPCP" or "IPv6CP" in the NCP field 563 as shown in, e.g., the entries 560-2 and 560-3, unlike the entry 560-1 produced upon the establishment of the LCP session.

In the measurement of statistics information for an NCP session, communication statistics information on each user is measured for a target NCP specified in the session management table 56. The measurement is carried out by the protocol processing circuit 42-i serving as the termination point of the PPP, similarly to the statistics information for an LCP session, and the statistics information measured here is periodically collected in the count field of the session management table 56.

The access server 4 transmits an accounting start request packet to the accounting server 20 at the time at which an NCP session is established (124). The accounting start request packet (Accounting request [start]) transmitted here includes, e.g., an attribute indicative of user allocation information in accordance with the NCP in use such as, e.g., the Framed-IP-Address attribute indicative of the IP address allocated to the user terminal in accordance with the IPCP in addition to the RADIUS attributes of the accounting start request packet transmitted in Step 107 of FIG. 6 when the measurement of the LCP statistics information is started.

The setting of a value to the Acct-Session-ID attribute serving as the identifier of the PPP session between the user terminal and the access server needs some ingenuity. This is because the RADIUS server identifies the accounting request packet by the IP address of the access server as the source of the accounting start request packet and the PPP session identifier shown by the Acct-Session-ID attribute. Accordingly, if different values are imparted to the NCP session ID and the LCP session ID as described above, it becomes possible for the accounting server 20 to process the request packet transmitted in Step 108 and the request packet transmitted in Step 124 as different accounting start request packets. In this case, however, the accounting server 20 encounters difficulty in correlating the LCP session with the NCP session multiplexed thereon.

FIG. 10 shows an example of an Acct-Session-ID 607 having enabled the correlation of the NCP session ID with the LCP session ID.

According to the definition in the RFC, alphabets are also usable in addition to numerals as characters for the Acct-Session-ID and the number of the characters is not limited. Therefore, if a character string comprising of a combination of the LCP session ID 641, the NCP identifier 642, the NCP session ID 643, and other identifiers 644 is used as the Acct-Session-ID 607 as shown in FIG. 10, the accounting server 20 can correlate the NCP session with the LCP session based on the Acct-Session-ID imparted to the accounting start request packet for an NCP session when the accounting server 20 processes the statistics information.

Referring again to FIG. 7, the access server 4 having transmitted the accounting start request packet waits for the reception of an NCP close request from the user terminal (125), instructs the corresponding protocol processing circuit 42-*i* to terminate the measurement of the NCP statistics information upon receiving the close request, and collects the statistics information on the closed NCP into the session management table 56 (126). The access server 4 generates the accounting stop request packet including the NCP statistics information, transmits the generated packet to the accounting server 20 (127), and deletes a table entry corresponding to the closed NCP from the session management table 56 (128). Here, the access server 4 checks whether a data link was released or not (129), returns to Step 120 if there is no released data link, and waits for a new NCP open request (120).

When the data link has been released, the access server 4 terminates the processing of the network layer protocol (NCP) phase and executes the processing from Step 109 shown in FIG. 6. It is also possible for the access server 4 to periodically generate packets for interim accounting and notifies the accounting server of latest statistics information after transmitting the accounting start request packet (124).

Figure 11:
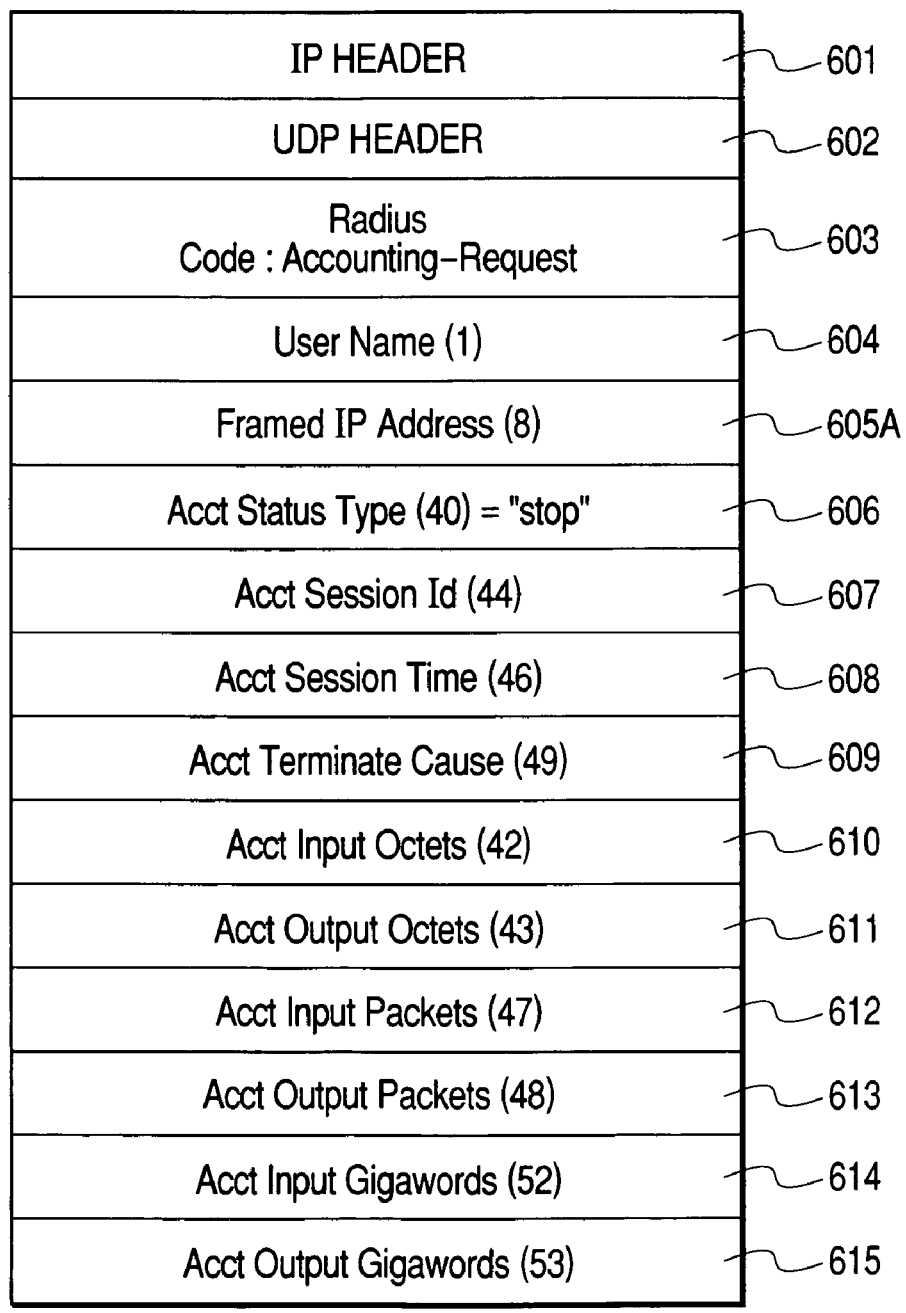
FIG. 11 is a view showing the format of an outputted accounting stop request packet transmitted from the access server 4 to the accounting server 20 when an IPCP session is released.

FIG. 11 shows an example of the format of an IPv4 accounting stop request packet (Accounting-Request [stop]) 600.

The IPv4 accounting stop request packet 600A is composed of an IP header 601, a UDP header 602, a RADIUS identification code field 603 indicating that this packet is a request packet for an accounting process, and a RADIUS attribute region subsequent to the above fields. The number enclosed in the parenthesis of each of the attributes described in the RADIUS attribute region represents the value of an attribute type defined in the RFC.

The attribute region of the IPv4 accounting stop request packet 600A includes a User-Name attribute 604 indicative of a user name as information for identifying a user terminal as an Internet access request transmitter, a Framed-IP-Address attribute 605A indicative of an IPv4 address allocated to the user, an Acct-Status-Type attribute 606 indicative of the type code of an accounting request packet or stop code (2) in the case of terminating accounting, an Acct-Session-ID attribute 607 for session identification, an Acct-Session-Time attribute 608 indicative of the time duration of the session, an attribute 609 indicative of a factor causing the termination of the session, and an Acct-Input-Octets attribute 610, an Acct-Output-Octets attribute 611, an Acct-Input-Packets attribute 612, an Acct-Output-Packets attribute 613, an Acct-Input-Gigawords attribute 614, and an Acct-Output-Gigawords attribute 615 each indicative of an amount of input/output data. The statistics information such as the amount of input/output data is entirely related to the IPv4.

In the accounting stop request packet transmitted upon the termination of the LCP statistics information measurement, the Acct-Session-ID attribute 607, the Acct-Session-Time attribute 608, and the session stop factor attribute 609 show the identifier, time duration, and stop factor of the terminated PPP session, respectively, while each of the attributes 610 to 615 indicating the amount of input/output data shows a value measured in the foregoing PPP session. In the accounting stop request packet transmitted upon the termination of the NCP statistics information measurement, on the other hand, the Acct-Session-ID attribute 607, the Acct-Session-Time attribute 608, the session stop factor attribute 609 show the identifier, time duration, and stop factor of the terminated NCP session, e.g., LPCP session, respectively, while each of the attributes 610 to 615 indicating the amount of input/output data shows a value measured in the NCP session.

FIG. 12 shows an example of the format of an IPv6 accounting stop request packet 600B.

The IPv6 accounting stop request packet 600B is also composed of the IP header 601, the UDP header 602, the RADIUS identification code field 603, and the RADIUS attribute region subsequent to the above fields which includes the same attributes as that included in the IPv4 accounting stop packet 600A. However, the accounting stop request packet 600B includes a Framed-IPv6-Prefix attribute 606B indicative of an IPv6 prefix allocated to the user in place of the Framed-IP-Address attribute 605A and the statistics information such as the amount of input/output data is entirely related to the IPv6.

In the IPv6 accounting stop request packet transmitted upon the termination of the NCP statistics information measurement, the Acct-Session-ID attribute 607, the Acct-Session-Time attribute 608, and the session stop factor attribute 609 show the identifier, time duration, and stop factor of the terminated NCP session, e.g., IPv6CP session, respectively, while each of the attributes 610 to 615 indicating the amount of input/output data shows a value measured in the foregoing NCP session.

Figure 13:
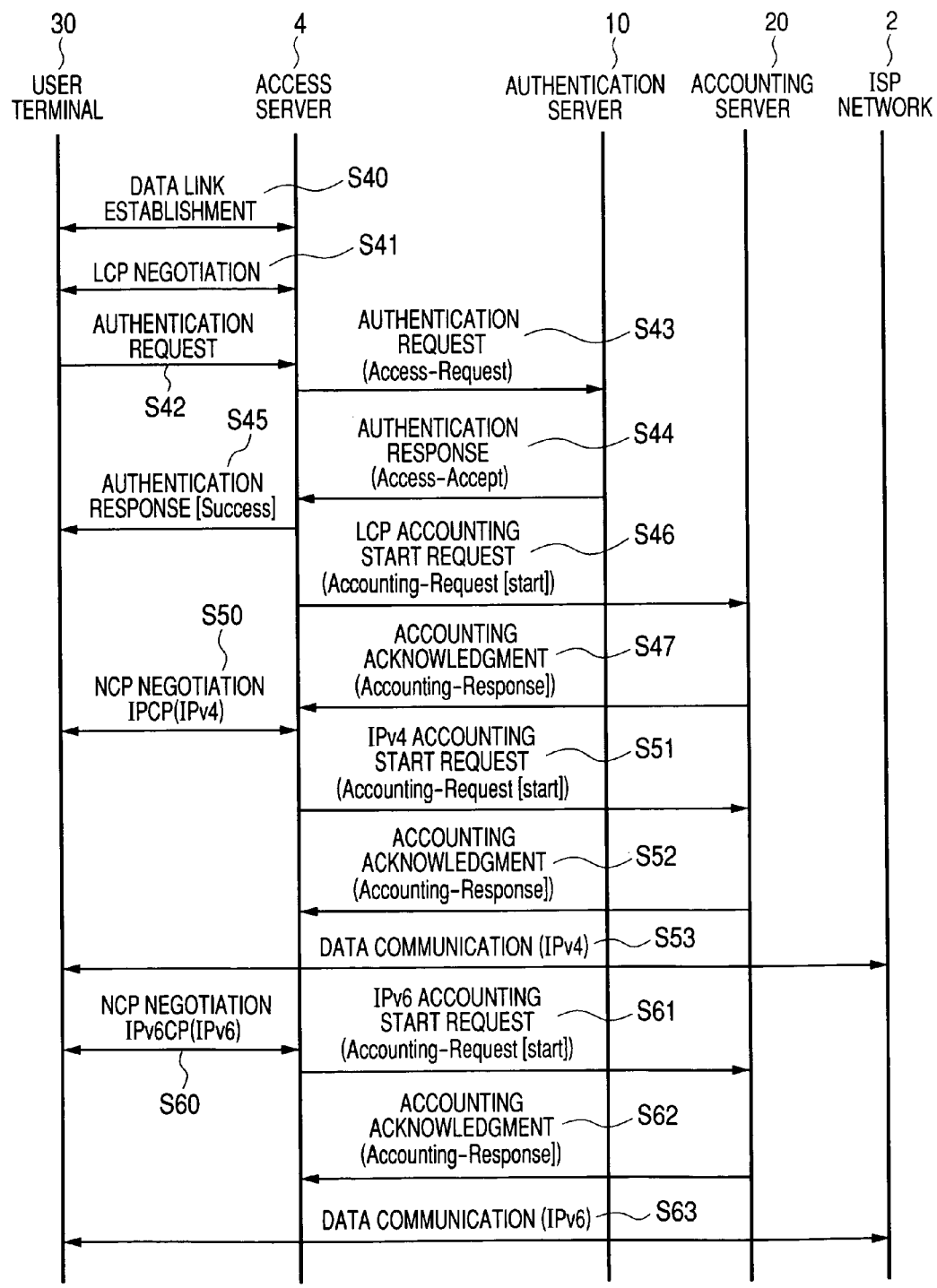
FIG. 13 is a view showing an example of a communication sequence in the network of FIG. 1 performed when the user terminal 30 is connected to the Internet 3.
Figure 14:
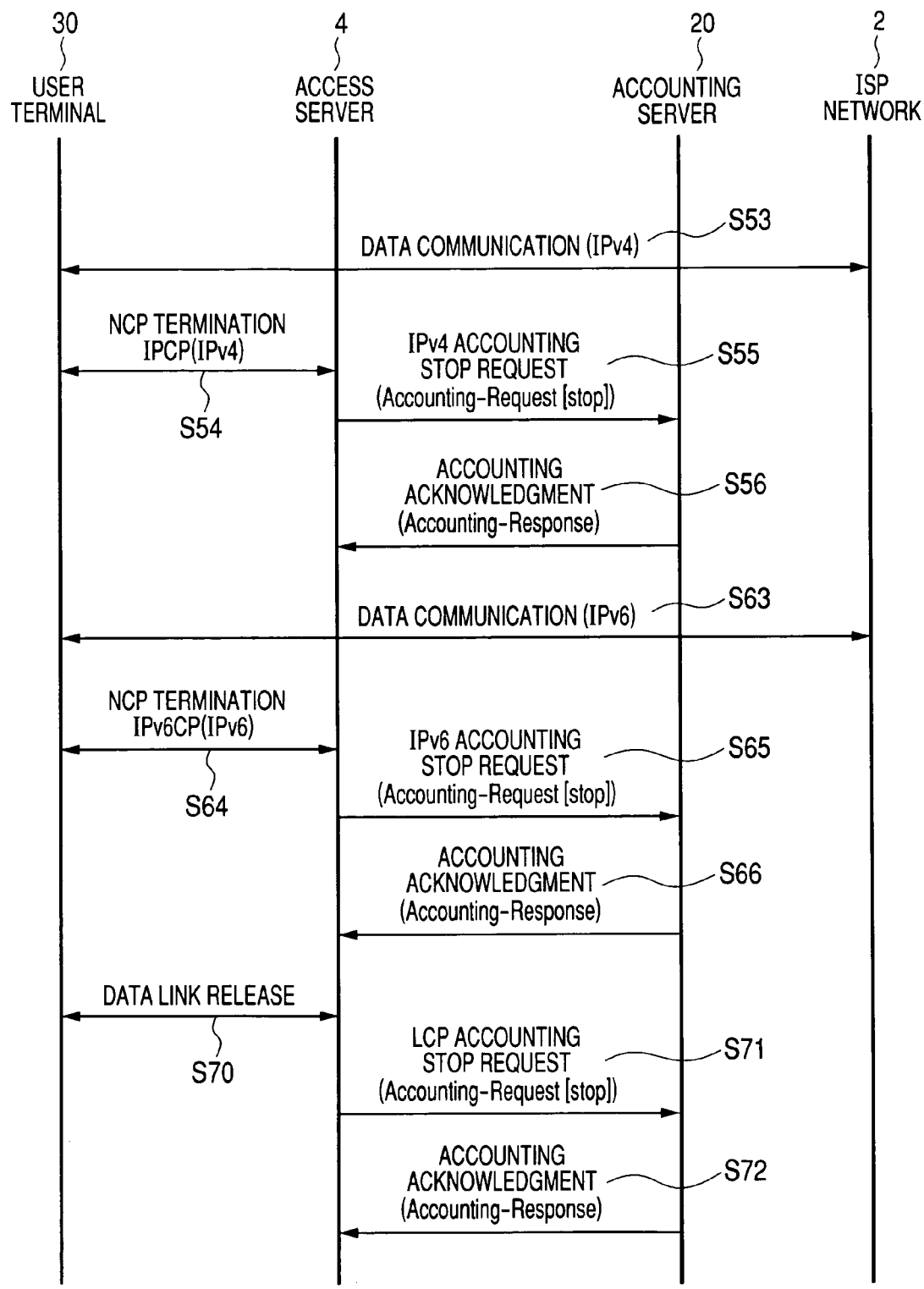
FIG. 14 is a view showing an example of a communication sequence performed when the connection between the user terminal 30 and the Internet 3 is released in the network of FIG. 1.

FIGS. 13 and 14 are sequence diagrams showing a procedure for access from each of the user terminals 30 (30-1 and 30-2) to the Internet 3 in the system configuration shown in FIG. 1 and a procedure for collecting statistics information (accounting information) performed by the access server 4.

FIG. 13 shows a sequence in the case where the user terminal 30 establishes an IPCP session to deal with the IPv4 and an IPv6CP session to deal with the IPv6 on a data link (PPP session) and performs data communication with a server on the Internet 3 via the ISP network 2. The sequence diagram illustrated here only shows primary sequences related to the present invention for the sake of clarity and do not precisely show all the messages communicated between the user terminal 30 and the access server 4 and between the access server 4 and the accounting server 20 in actual applications.

The user terminal 30 establishes a data link with the access server 4 (S40) and performs an LCP negotiation (S41). The data link (PPP session) is established through the execution of, e.g., a PPPoE initialization process shown in the RFC 2516 by the user terminal 30, through the execution of the PPPoE initialization process by the protocol processing circuit 42-i of the access server 4 connected to the user terminal 30, and through the execution of the PPP protocol processing routine 54 by the control processing unit 44. When the PPP session is established, the control processing unit 44 of the access server 4 executes an LCP negotiation with the user terminal 30 and sets a link layer (S41).

In response to an authentication request from the user terminal 30 (S42), the access server 4 requests the authentication server 10 of user authentication in accordance with, e.g., the CHAP (Challenge Handshake Authentication Protocol) shown in the RFC 1994 (S43) Specifically, the control processing unit 44 of the access server 4 executes the RADIUS protocol processing routine 57 and transmits an authentication request (Access-Request) packet indicative of a user name and a password to the authentication server 10.

The authentication server 10 judges whether the user terminal 30 is connectable to the ISP network 2 depending on whether the password shown in the authentication request packet has preliminarily been registered in correspondence with the user name and notifies the access server 4 of the result of the judgment (S44). When the user authentication is completed successfully, the access server 4 transmits a response packet indicative of the successful authentication to the user terminal 30 (S45), generates an LCP table entry in the session management table as described in Steps 103 to 106 of FIG. 6, and starts the measurement of LCP statistics information. After that, the access server 4 transmits a start request packet (Accounting-Request [start]) for the collection of statistics information (LCP accounting process) to the accounting server 20 (S46). The accounting server 20 checks the presence or absence of an accounting information management record in an accounting information database in accordance with the user name shown in the start request packet, prepares for the recording of the statistics information transmitted from the access server 4, and returns an accounting acknowledgment response (Accounting-Response) packet (S47).

After transmitting the LCP accounting start request, the access server 4 has proceeded to the network layer protocol phase described with reference to FIG. 7 and is in the state of waiting for an NCP open request from the user terminal. The present embodiment assumes the case where the user terminal 30 having received a response packet (S45) indicative of the successful authentication issues an IPCP open request in accordance with the IPv4 first.

Upon receiving the IPCP (IPv4) open request, the access server 4 performs the NCP negotiation with the user terminal 30 (S50). If the negotiation is completed successfully, the access server 4 generates an NCP (IPCP) table entry in the session management table as described in Steps 121 to 123 of FIG. 7, starts the collection of the NCP statistics information, and transmits a start request packet (Accounting-Request [start]) for the collection of IPv4 statistics information (IPv4 accounting processing) to the accounting server 20 (S51). The accounting server 20 checks the presence or absence of an accounting information management record in the accounting information database, prepares for the recording of the statistics information, and returns an accounting acknowledgment response (Accounting-Response) packet (S52).

When the NCP negotiation (S50) is completed, the user terminal 30 is brought into a data communication state with a server on the Internet 3 via the ISP network 2 in accordance with the IPv4 protocol (S53). The present embodiment assumes the case where an IPv6CP open request has been issued while the user terminal sustains the data communication state in accordance with the foregoing IPv4 protocol.

Upon receiving the IPv6CP open request, the access server 4 performs the NCP negotiation with the user terminal 30 (S60). When the negotiation is completed successfully, the access server 4 generates an NCP (IPv6CP) table entry in the session management table as described in Steps 121 to 123 of FIG. 7, starts the collection of the NCP statistics information, and transmits a start request packet (Accounting-Request [start]) for the collection of the IPv6 statistics information (IPv6 accounting processing) to the accounting server 20 (S61). The accounting server 20 checks the presence or absence of an accounting information management record in the accounting information database in the same manner as when the start request for the IPv4 accounting process was issued, prepares for the recording of the statistics information, and returns an accounting acknowledgment response (Accounting-Response) packet (S62).

When the NCP negotiation (S60) is completed, the user terminal 30 is brought into a data communication state with a server on the Internet 3 via the ISP network 2 in accordance with the IPv6 protocol (S63).

FIG. 14 shows a sequence in the case where an NCP session and an Internet session are terminated.

When the user terminal 30 in the data communication state in accordance with the IPv4 and IPv6 (S53 and S63) transmits an IPCP termination request which is an IPv4NCP termination request (Step S54), the access server 4 executes the process of terminating the collection of statistics information for the corresponding NCP (=IPCP) (Step 126 in FIG. 7) and transmits an IPv4 accounting stop request packet including the foregoing statistics information and shown in FIG. 11 to the NCP accounting server 20 (S55) The accounting server 20 updates the accounting database based on the statistics information indicated in the IPv4 accounting stop request packet and returns an accounting acknowledgment response (Accounting-Response) packet to the access server 4 (S56).

Likewise, when the user terminal 30 transmits an IPv6CP termination request (S64), the access server 4 executes the process of terminating the collection of statistics information for the corresponding NCP (=IPv6CP) and transmits an IPv6 accounting stop request packet including the foregoing statistics information shown in FIG. 12 to the NCP accounting server 20 (S65) The accounting server 20 updates the accounting database based on the statistics information indicated in the IPv6 accounting stop request packet and returns an accounting acknowledgment response (Accounting-Response) packet to the access server 4 (S66).

When the user terminal 30 releases the data link thereafter (S70), the access server 4 executes the process of terminating the LCP statistics information measurement in accordance with Steps 110 and 111 shown in FIG. 6, generates an LCP accounting stop request packet including the foregoing statistics information, and transmits the generated packet to the accounting server 20 (S71). The accounting server 20 updates the accounting database based on the statistics information indicated in the LCP accounting stop request packet and returns an accounting acknowledgment response (Accounting-Response) packet to the access server 4 (S72).

Figure 15:
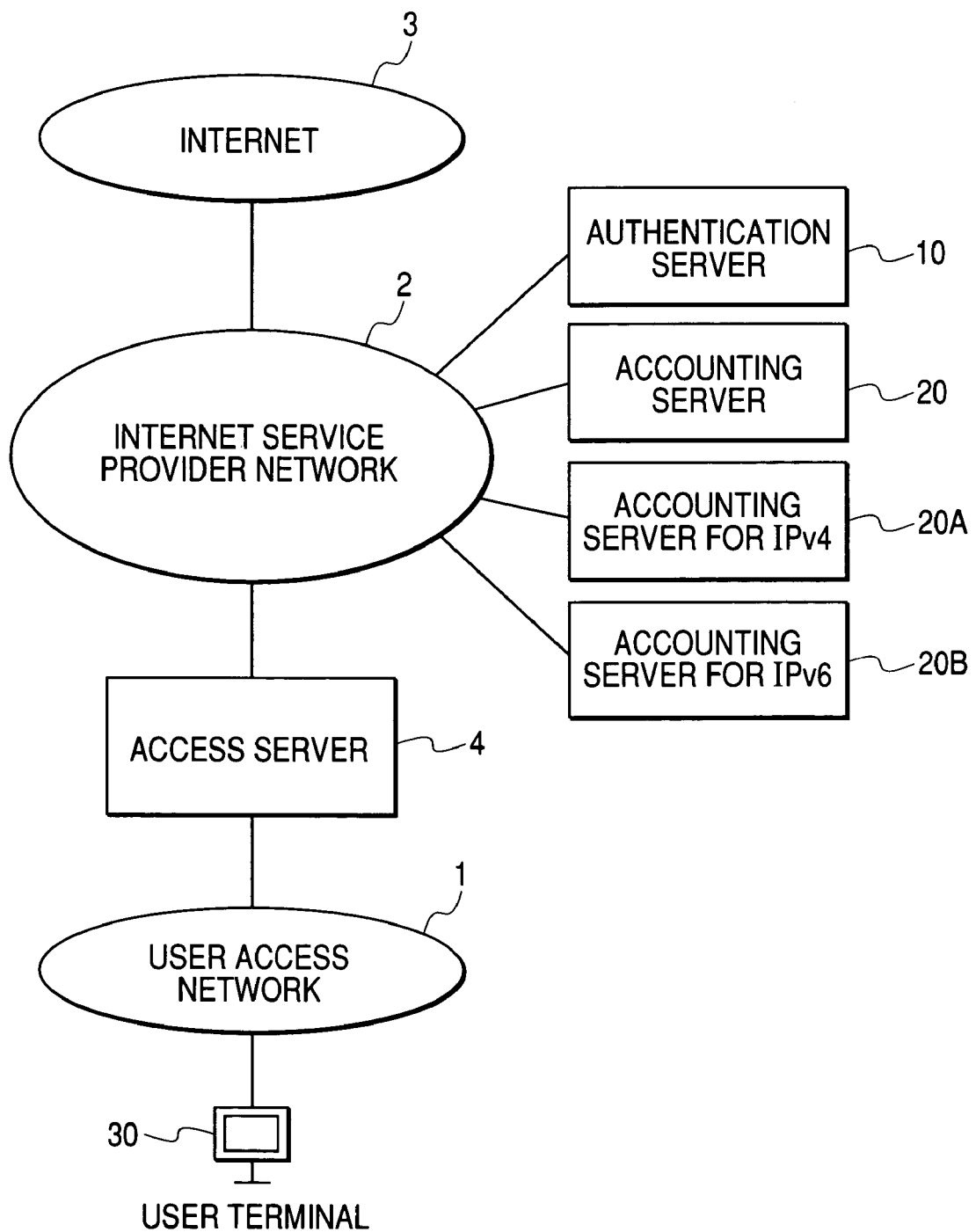
FIG. 15 is a view showing a second embodiment of the network configuration to which the access server according to the present invention is applied.

FIG. 15 shows a second embodiment of a network configuration to which the access server according to the present invention is applied.

The second embodiment is characterized in that an accounting server 20A dedicated to the management of IPv4 statistics information and an accounting server 20B dedicated to the management of IPv6 statistics information are provided as RADIUS servers connected to the Internet service provider network 2 in addition to the authentication server 10 and the accounting server 20.

Figure 16:
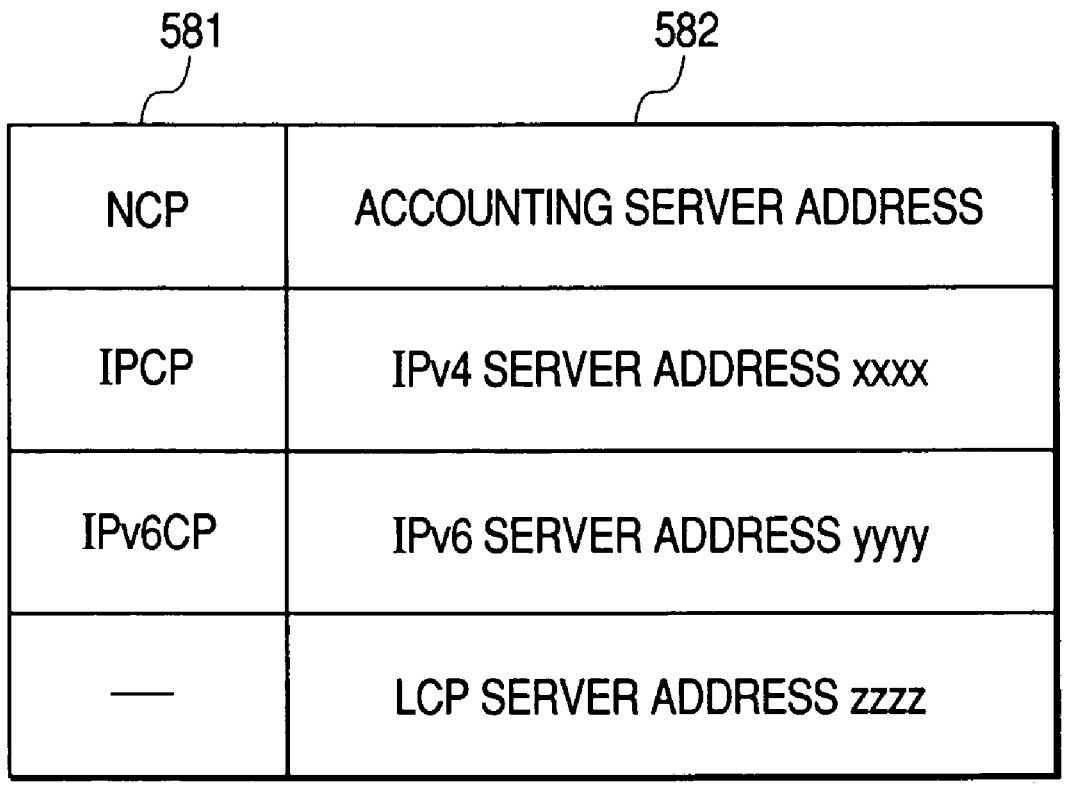
FIG. 16 is a view showing an embodiment of an accounting server address table 230 applied to the access server 4 in the second embodiment of the present invention.

In this case, a destination server to which an accounting start request and an accounting stop request are transmitted differs depending on the type of an NCP in use so that an accounting server address table 58 defining, e.g., a relationship between an in-use NCP 581 and an accounting server address 582 is prepared in the RADIUS protocol processing routine 57 as shown in FIG. 16. If the in-use NCP is unspecified, the address of the accounting server 20 for managing statistics information for each LCP-session is designated as the accounting server address 582.

In the present embodiment, LCP statistics information, IPv4 statistics information, and LPv6 statistics information are individually summed up at the accounting servers 20, 20A, and 20B, respectively, so that it is no more necessary to provide the accounting server 20 with the function of individually classifying and organizing information accumulated in the accounting database for each of LCP and NCP sessions.

Although the management of statistics information is distributed among the LCP accounting server 20, the IPv4NCP accounting server 20A, and the IPv6NCP accounting server 20B in the configuration shown in FIG. 15, it is also possible to sum up and manage the LCP statistics information at either of the IPv4NCP accounting server 20A and the IPv6NCP accounting server 20B by omitting the accounting server 20 and modifying the accounting server address table 58. For load distribution at the RADIUS server in the system configuration of each of the first and second embodiments, a redundant system configuration in which each of the authentication server and the accounting server (20, 20A, and 20B) is comprised of a plurality of servers may also be adopted.

The foregoing embodiments allow the collection of the statistics information such as a session time and an amount of input/output data for each NCP without adding a new attribute to the RADIUS.

As is obvious from the above embodiments, according to the present invention, the access server can individually collect statistics information on each of NCP sessions multiplexed on the same LCP session or formed by time division multiplexing in addition to the statistics information on each of LCP sessions and notify the accounting server of the collected statistics information. Accordingly, the present invention allows more detailed management of the statistics information than performed conventionally.

What is claimed is:

1. An access server connected to a user access network and to an Internet service provider (ISP) network, the access server comprising of:

first means for individually collecting communication statistics information on each of LCP sessions that was formed in accordance with an LCP (Link Control Protocol) procedure performed after a data link has been established in response to a data link establish request from a user terminal connected to said user access network and notifying, when said data link is released, an accounting server, which is connected to said ISP network for managing the communication statistics information, of the statistics information on the LCP session corresponding to the released data link;

second means for individually collecting communication statistics information on each of NCP (Network Control Protocol) sessions that was established on one of said LCP sessions and notifying, when one of said NCP sessions is released, said accounting server of the statistics information on the released NCP session; and wherein said first means transmits, when each of said LCP sessions was established, a statistics process start request for LCP session to said accounting server and transmits, when said data link is released, a statistics process stop request including said statistics information on the LCP session to said accounting server;

said second means transmits a statistics process request for the NCP session to said accounting server when each of said NCP sessions was established, and transmits, when the NCP session is released, a statistics process stop request includes said statistics information on the released NCP session to said accounting server; and wherein each said first and second means notifies said accounting server of the statistics information collected thereby in a packet format in accordance with a RADIUS (Remote Authentication Dial In User Service) protocol.

2. The access server according to claim 1, wherein
said first means notifies said accounting server of said statistics information on the LCP session by using a packet including an identifier specific to each of the LCP sessions, and said second means notifies said accounting server of said statistics information on the NCP session by using a packet including an identifier specific to each of the NCP sessions.

3. The access server according to claim 1, wherein
said first means notifies said accounting server of said statistics information on the LCP session by using a packet including an identifier specific to each of the LCP sessions, and said second means notifies said accounting server of said statistics information on the released NCP session by using a packet including a session identifier composed of a combination of an identifier specific to each of the NCP sessions and an identifier of the LCP session to which the NCP session belongs.

4. The access server according to claim 1, wherein
said first means notifies said accounting server of said statistics information on the LCP session by using a packet including an identifier specific to each of the LCP sessions, and said second means notifies said accounting server of said statistics information on the released NCP session by using a packet including a session identifier composed of a combination of an identifier specific to each of the NCP sessions and an identifier of the LCP session to which the NCP session belongs.

5. The access server according to claim 1, wherein
each of said first and second means notifies said accounting server of the statistics information collected thereby in a packet format in accordance with a RADIUS (Remote Authentication Dial In User Service) protocol.

6. The access server according to claim 2, wherein
each of said first and second means notifies said accounting server of the statistics information collected thereby in a packet format in accordance with a RADIUS (Remote Authentication Dial In User Service) protocol.

7. The access server according to claim 3, wherein
each of said first and second means notifies said accounting server of the statistics information collected thereby in a packet format in accordance with a RADIUS (Remote Authentication Dial In User Service) protocol.

8. The access server connected to a user access network and to an Internet service provider (ISP) network, the access server comprising of:

first means for executing an LCP (Link Control Protocol) procedure with an user terminal connected to said user access network after a data link was established in response to a data link establish request from the user terminal, for executing a user authentication procedure with a RADIUS (Remote Authentication Dial In User Service) server connected to said ISP network in response to a user authentication request from the user terminal, starting individual collection of communication statistics information on each of LCP sessions that was formed in accordance with said LCP procedure, and notifying, when said data link is released, said RADIUS server of the statistics information on the LCP session corresponding to the released data link;

second means for individually collecting communication statistics information on each of NCP (Network Control Protocol) sessions that was established on one of said LCP session and notifying, when one of said NCP sessions was released, said RADIUS server of the statistics information on the released NCP session;

wherein said first means transmits, when each of said LCP sessions was established, a statistics process start request for the LCP session to said RADIUS server and transmits, when said data link is released, a statistics process stop request including said statistics information on the LCP session to said RADIUS server; and said second means transmits to said RADIUS server a statistics process start request for an NCP session when the NP session was established and transmits, when the NCP session is released, a statistics process stop request including said statistics information on the released NCP session to said RADIUS server.

9. The access server according to claim 8, wherein
said first means notifies said RADIUS server of said statistics information on the LCP session by using a RADIUS packet including an identifier specific to each of the LCP sessions as an Acct-Session-ID, and said second means notifies said RADIUS server of said statistics information on the released NCP session by using a RADIUS packet including an identifier specific to each of the NCP sessions as the Acct-Session-ID.

10. The access server according to claim 9, wherein
said second means notifies said RADIUS server of said statistics information on the released session by using a RADTUS packet including an identifier of the NCP session and an identifier of the LCP session to which the NCP session belongs as said Acct-Session-ID.

11. The access server according to claim 8, wherein
said RADIUS server includes a plurality of accounting servers for managing communication statistics information corresponding to types of the NCP sessions, and said second means transmits said RADIUS packet to one of the accounting servers corresponding to the type of the established or released NCP session.

* * * * *